United States Patent [19]

Allen

[11] 4,081,044
[45] Mar. 28, 1978

[54] FEED CONTROL SYSTEM FOR MULTIPLE PACKAGING MACHINES

[76] Inventor: Kenneth Martin Allen, Box 352, Newberg, Oreg. 97132

[21] Appl. No.: 795,498
[22] Filed: May 10, 1977
[51] Int. Cl.² ............... G01G 13/00; G01G 13/04; B67D 5/08
[52] U.S. Cl. ............................ 177/103; 177/121; 222/56
[58] Field of Search .............. 177/57, 58, 60, 103, 177/104, 121; 222/56; 302/13, 28

[56] References Cited
U.S. PATENT DOCUMENTS

| | | | |
|---|---|---|---|
| 2,608,372 | 8/1952 | Ferguson et al. | 177/57 X |
| 3,077,365 | 2/1963 | Fisher | 302/28 |
| 3,237,807 | 3/1966 | Garrey | 222/56 |
| 3,534,709 | 10/1970 | Thompson | 222/56 X |
| 3,544,167 | 12/1970 | Fuchu et al. | 302/13 |
| 3,708,208 | 1/1973 | Fuss | 302/28 |
| 3,851,925 | 12/1974 | Roberson | 302/28 |
| 3,901,555 | 8/1975 | Wise | 302/28 |

Primary Examiner—George H. Miller, Jr.
Attorney, Agent, or Firm—Larson, Taylor and Hinds

[57] ABSTRACT

A feed control system for a plurality of packaging machines is provided wherein the overall supply to the machines is controlled in accordance with total demand. A pulse is produced by each machine after a filling and sealing operation is completed and a weight constant multiplier is employed to multiply this pulse by a weight constant associated with the package (the number of grams or ounces contained in the package). The outputs of all of the weight constant multipliers are connected to a parallel to series converter which produces a signal in the form of a pulse train representative of the total weight requirements of all packaging machines per unit time. This signal is converted into a corresponding voltage level which is utilized by a storage conveyor motor controller to control the overall feed rate to the machines.

10 Claims, 1 Drawing Figure

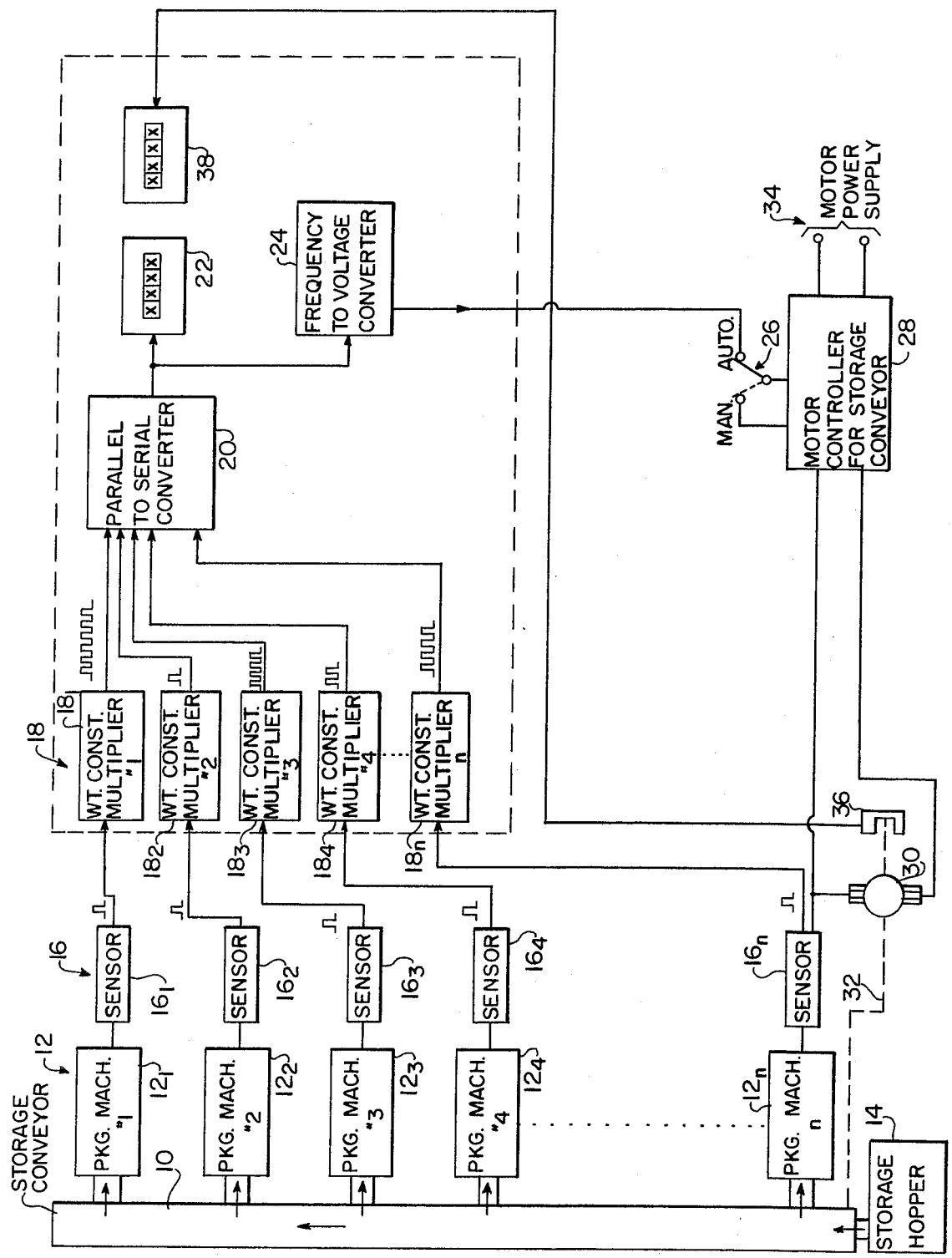

FEED CONTROL SYSTEM FOR MULTIPLE PACKAGING MACHINES

FIELD OF THE INVENTION

The present invention relates to packaging machines and, more particularly, to a feed control system for packaging machines wherein the total supply to machines is matched to the product demand rate estimated for all of the machines.

BACKGROUND OF THE INVENTION

There are, of course, a large number of conveyor and other feed systems which have been developed for various purposes including the feeding of product to packing machines. Many of these systems include relatively complex controls and, for example, employ computer activation and monitoring. Representative examples of relatively simple conveyor and like systems, and the controls therefor, are contained in U.S. Pat. Nos. 2,618,162 (Musschoot); 3,011,621 (Byrnes); 3,645,305 (Warlop); and 3,731,787 (Gregor). Characteristically, packaging machine control systems detect the feed conditions at each station and individually control the feed to that station accordingly. For example, in the Warlop patent, a photocell arrangement is employed to detect the "full" condition at each station and to control, responsive to detecting such a condition, the closing of a gate for the feed from a conveyor. Somewhat similarly, in the Gregor patent a photocell arrangement is used to sense the fill level at each machine and to activate upstream vibrators to complete filling to the full level.

SUMMARY OF THE INVENTION

According to the invention, a feed control system or demand controller for a multiple packaging machine is provided which determines the total product demand rate of all of the packaging machines in a packaging distribution line and controls the supply means for the distribution line in accordance with that demand rate, i.e., "matches" the feed rate of the supply means with the demand at any given time. The system is less complex as compared with prior art systems in general and, in particular, as compared with systems which provide individual feed control at each distribution point. However, despite this reduction in complexity, the system of the invention provides effective control of the multiple packaging machine operation.

In a preferred embodiment, the control system includes signal generating means, individual to each of the packaging machines, for producing an output signal responsive to the associated packaging machine completing a packaging cycle, e.g., completing a filling and sealing operation; means, connected to the outputs of the signal generating means, for individually weighting the output signals so as to produce weighted signals corresponding to the weight constant (i.e., the number of ounces or grams per package) of the packages produced by the individual packaging machines; means for converting said weighted signals into a total demand signal representative of the overall demand of all of the packaging machines; and means for controlling the overall rate of feed from the supply means to the distribution line in accordance with the total demand signal.

Advantageously, the signal generating means comprises pulse generating means for generating a pulse when a packaging cycle is completed and the weighting means comprises a plurality of multipliers, individual to the pulse generating means, for producing a plurality of parallel output signals whose frequencies are each weighted in accordance with the weight constant of the packages produced by the associated packaging machine, i.e., produces outputs in the form of pulse trains containing a number of pulses representative of the corresponding weight constant. A parallel to serial converter converts the parallel output signals into a total demand signal, i.e., a signal whose frequency is related to the total demand of all of the packaging machines. Preferably, a frequency to voltage converter is employed to convert the total demand signal into a corresponding voltage which is, in turn, used to control a motor controller for the supply means. In the preferred embodiment, the supply means comprises a storage conveyor and the motor controller acts to control the conveyor motor and thus the feed rate.

Other features and advantages of the invention will be set forth in, or apparent from, the detailed description of a preferred embodiment found hereinbelow.

BRIEF DESCRIPTION OF THE DRAWINGS

The single FIGURE in the drawings is a block diagram of the feed control system of the invention.

DESCRIPTION OF THE PREFERRED EMBODIMENTS

Referring to the drawings, a conventional storage conveyor, indicated schematically at 10, feeds a plurality of individual packaging machines 12, $12_2$, $12_3$, $12_4$...$12_n$, which are collectively denoted 12 and are disposed at spaced locations along conveyor 10 as illustrated. Storage conveyor 10 itself is fed from a storage hopper 14. The storage hopper 14 and the packaging machines 12 are all of conventional construction and can take a number of different common forms. Moreover, as will become evident, the invention is not limited to feeding packaging machines from a storage conveyor and can be employed in any application wherein there is a multiplicity of demand points with definite increments of demand at predetermined rate.

A plurality of sensors 16, $16_2$, $16_3$, $16_4$, ...$16_n$, (which are collectively denoted 16) are associated with packaging machines 12, $12_2$, $12_3$, $12_4$, ...$12_n$, respectively, and are utilized to sense when the corresponding packaging machine fills and seals a package. Upon this occurrence, a pulse is produced. The sensors can take a number of forms and, for example, can comprise a micro-switch or photo-cell actuated by the package sealing mechanism when the latter completes a sealing operation.

A like plurality of weight constant multipliers 18, $18_2$, $18_3$, $18_4$...$18_n$, (collectively denoted 18) are connected to the outputs of sensors. Multipliers 18 are used to multiply the pulse by the weight constant of each package, i.e., the number of ounces or grams per package. Multipliers of this general type are common and the multipliers used can take a number of different conventional forms. The output produced can be pulse train of a plurality of pulses whose number represents the weight constant, or a pulse of a predetermined duration, with the width of the pulse representing the weight constant. In the embodiment under consideration a plurality of pulses, representative of the weight constant, are utilized.

The outputs of weight constant multipliers 18 are connected to a parallel to serial converter 20 which converts the parallel inputs from the weight multipliers into a serial output in the form of a pulse train representing the total weight requirements of all of the packaging machines 12, per unit time. Again, parallel to serial converters are conventional and any one of a number of more or less standard circuits could be used for this purpose. A demand display device 22 is connected to the output of parallel to serial converter 20 to provide an indication of the total demand from all of the packaging machines and is scaled, for example, to read in terms of weight per minute.

A conventional frequency to voltage converter 24 is also connected to receive the output of parallel to serial converter 20. Frequency to voltage converter 24 simply converts the pulse train output of converter 20 into a signal whose voltage level corresponds to the frequency, i.e., the number of pulses per unit time, of the input signal from converter 20 and which thus corresponds to the total demand per unit time.

The output signal of frequency to voltage converter 24 is connected to motor controller circuit 28 through a two-position switch 26 when the latter is in the automatic or "AUTO" position or mode thereof. Motor controller circuit 28 is also conventional and serves to control the speed of a conveyor motor 30 which is coupled to storage conveyor 10 through a direct mechanical coupling indicated at 32. Motor controller 28 and motor 30 are supplied power by a motor power supply indicated schematically at 34. With switch 26 in the manual or "MAN" position, a manual override is provided by which the speed of the conveyor motor 30 can be controlled directly by the operator.

A conventional optical-electronic transducer 36 is used to detect the speed of the motor 30, and associated circuitry is employed to convert the corresponding signal into an indication of the actual product weight per unit time (weight per minute in the specific embodiment) being fed to the distribution line from hopper 14 by storage conveyor 10. A further display device 38, which is connected to the output of transducer 34 and which thus provides an indication of the actual supply, is disposed adjacent to the demand display device 22 at the operator's station so that a direct comparison of total demand per unit and total supply per unit time can be made.

Although the invention has been described relative to exemplary embodiments thereof, it will be understood that other variations and modifications can be effected in these embodiments without departing from the scope and spirit of the invention.

I claim:

1. A feed control system for multiple packaging machines located at different stations along a distribution line and fed from a common supply, said control system comprising:

means, individual to the packaging machines, for producing an output signal in response to the associated packaging machine completing a packaging cycle;

means, connected to the outputs of said output signal producing means, for individually weighting the output signals produced by said output signal producing means so as to produce weighted signals corresponding to the weight constants of the packages produced by the individual packaging machines;

means for converting said weighted signals into a total demand signal representative of the overall demand of all of the packaging machines; and means for controlling the overall rate of feed from said common supply to the distribution line and hence to the packaging machines in accordance with said total demand signal.

2. A system as claimed in claim 1 wherein said weighting means comprises multiplier means individual to said signal producing means for multiplying said output signals produced by said signal producing means by a factor corresponding to the weight constant of the packages produced by the associated packaging machine.

3. A system as claimed in claim 1 wherein said common supply includes a storage conveyor for feeding product to the packaging means and wherein said feed rate controlling means comprises means for controlling said feed conveyor.

4. A system as claimed in claim 1 wherein said converting means includes means for receiving said weighted signals and generating an output signal in accordance therewith whose frequency is representative of the overall demand of all of the packaging machines.

5. A system as claimed in claim 1 wherein said weighting means comprises a plurality of multipliers, individual to said signal producing means, for producing a plurality of parallel output signals whose frequencies are each weighted in accordance with the weight constant of the packages produced by the associated machines, and wherein said converting means comprises a parallel to serial converter for receiving said parallel outputs and converting the same into an output signal whose frequency is representative of the total demand, and frequency to voltage converter means for converting the output signal produced by said parallel to serial converter into a total demand signal whose voltage level is representative of the overall demand of all of the packaging machines.

6. A system as claimed in claim 5 further comprising display means for displaying the output of said parallel to serial converter.

7. A system as claimed in claim 5 wherein said common supply includes a storage conveyor for feeding product to each of the packaging means and wherein said feed rate controlling means comprises means for controlling said feed conveyor.

8. A system as claimed in claim 7 further comprising means for manually overriding said means for controlling said feed conveyor.

9. A system as claimed in claim 8 wherein feed conveyor controlling means includes a feed conveyor drive motor and a feed conveyor motor controller for controlling said motor, said system further comprising display means for indicating said overall demand and means, including transducer means, for detecting the operational speed of said motor, for indicating the overall supply being fed to said packaging machines.

10. A system as claimed in claim 9 further comprising switch means for said motor controller having a first, automatic position wherein said motor controller is controlled automatically in accordance with the output of said converting means and a second, manual position wherein said motor controller can be operated manually.

* * * * *